United States Patent [19]

Spinhirne

[11] Patent Number: 5,241,315
[45] Date of Patent: Aug. 31, 1993

[54] MICRO PULSE LASER RADAR

[75] Inventor: James D. Spinhirne, Glenn Dale, Md.

[73] Assignee: The United States of America as represented by the Administrator of the National Aeronautics and Space Administration, Washington, D.C.

[21] Appl. No.: 929,216

[22] Filed: Aug. 13, 1992

[51] Int. Cl.$^5$ .................... G01C 3/08; G01S 13/95
[52] U.S. Cl. .................... 342/54; 342/26; 356/5; 356/28.5; 356/342
[58] Field of Search .................... 342/54, 26, 22, 460; 356/5, 28.5, 342

[56] References Cited

U.S. PATENT DOCUMENTS

| | | | |
|---|---|---|---|
| 3,788,742 | 1/1974 | Garbunny | 356/5 |
| 3,963,347 | 6/1976 | Segre et al. | 356/5 |
| 4,397,549 | 8/1983 | Morgan | 356/5 |
| 4,464,048 | 8/1984 | Farlow | 356/5 |
| 4,605,302 | 8/1986 | Löfgren et al. | 356/5 |
| 4,643,564 | 2/1987 | Löfgren et al. | 356/5 |
| 4,722,599 | 2/1988 | Fruengel et al. | 356/5 |
| 4,735,503 | 4/1988 | Werner et al. | 356/28.5 |
| 4,859,055 | 8/1989 | Gal et al. | 356/28 |
| 4,902,127 | 2/1990 | Byer et al. | 356/5 |
| 4,995,720 | 2/1991 | Amzajerdian | 356/5 |
| 5,024,526 | 6/1991 | von Redwitz | 356/73 |
| 5,116,124 | 5/1992 | Hüttmann | 356/342 |

Primary Examiner—John B. Sotomayor
Attorney, Agent, or Firm—Paul S. Clohan, Jr.; R. Dennis Marchant; Guy M. Miller

[57] ABSTRACT

An eye safe, compact, solid state lidar for profiling atmospheric cloud and aerosol scattering is disclosed. The transmitter of the micro pulse lidar is a diode pumped $\mu J$ pulse energy, high repetition rate Nd:YLF laser. Eye safety is obtained through beam expansion. The receiver employs a photon counting solid state Geiger mode avalanche photodiode detector. Data acquisition is by a single card multichannel scaler. Daytime background induced quantum noise is controlled by a narrow receiver field-of-view and a narrow bandwidth temperature controlled interference filter. Dynamic range of the signal is limited by optical geometric signal compression. Signal simulations and initial atmospheric measurements indicate that micro pulse lidar systems are capable of detecting and profiling all significant cloud and aerosol scattering through the troposphere and into the stratosphere. The intended applications are scientific studies and environmental monitoring which require full time, unattended measurements of the cloud and aerosol height structure.

6 Claims, 6 Drawing Sheets

MICRO PULSE LASER RADAR

ORIGIN OF THE INVENTION

The invention described herein was made by an employee of the United States Government, and may be manufactured and used by or for the Government for governmental purposes without the payment of any royalties thereon or therefor.

TECHNICAL FIELD

This invention relates to laser radars or lidars in general and more particularly to an eye safe solid state lidar for profiling atmospheric cloud and aerosol scattering.

BACKGROUND ART

Lidar has been a research tool for over twenty years. However even though there are significant potential applications, routine operational use of lidar, in the mode common for radar, has not happened. There are three primary limitations which have held back the use of current conventional lidar systems. The first factor is the lack of eye safety of pulsed laser transmitters for ground personnel and aircraft operations. Safety considerations oblige that current systems require constant supervision whenever non eye safe laser beams are in use. A second limitation is the cost, size and complexity of the lidar systems that are now employed for atmospheric research. Third, although the technology is rapidly advancing, the lack of reliability of conventional pulsed lasers has been a problems for routine lidar use. The effect of the second and third, and also first, factors given above is that current lidar use is very personnel intensive. For routine or full time lidar observations for applied or scientific applications eye safe, turn key, autonomous systems are what are needed.

Two previous types of laser radar systems in the prior art have the same applications as the present invention. Laser diode ceilometers, which are commercially available and widely used are in fact solid state, eye safe, autonomous laser radar instruments. However their performance is rather limited. Cloud detection is limited to 3 to 7 km, and the ceilometers do not reliably detect cirrus clouds. A study has been made of the application of diode ceilometers to profile boundary layer aerosols. The results were generally unfavorable. Whether the performance of current diode ceilometers may be significantly enhanced over current instruments is doubtful.

A high PRF lidar with photon counting data acquisition is the University of Wisconsin's High Spectral Resolution Lidar (HSRL). In concept, the HSRL is similar to the present invention. However, the HSRL was intended for a specific complex measurement which involves spectral separation . of the molecular and aerosol backscatter return, and the original HSRL was based on a CuCL laser and employs complex etalon filters and PMT detectors. The emphasis of the present invention is as a simple general purpose elastics scattering lidar for cloud and aerosol applications.

Another prior art approach for eye safe lidar is to operate at near infrared wavelengths which are beyond the transmission range of the eye's cornea. In a recent aerosol backscatter experiment, a lidar system was operated at the eye safe wavelength of 1.54 μm. However, at present, incoherent near infrared lidars are severely limited in performance by the noise level of available detectors. A large, high power lidar is required to obtain aerosol measurements. Near infrared lidars which employ coherent signal detection have much potential but are complex and will likely remain sophisticated and expensive instruments.

Recent advances in technology make possible what I believe can be considered a new type of laser radar system which is eye safe, simple, low cost and capable of full time unattended aerosol and molecular scattering observations. Conventional visible wavelength lidar systems which have been employed for most published lidar work to date make use of 0.1 to 1.0 Joule class lasers and operate at a pulse repetition rate of up to several tens of Hertz. The basic design of the lidar that I will describe below is a system with micro Joule level pulse energies and pulse repetition rates of several thousand Hertz and which also employs efficient photon counting signal detection and acquisition. The low pulse energy permits transmitted beam energy densities that are within eye viewing safety standards. With micro Joule pulse energies the return signal levels for aerosol and molecular observations are within the range where quantum noise limited photon counting detection is necessary. Technologies which now make my lidar practical are small diode pumped Nd:YAG and Nd:YLF lasers, solid state Geiger Avalanche Photo Diode photon counting detectors and single card, low cost multi-channel scalar signal acquisition. Since the components are all solid state, high reliability is achieved.

STATEMENT OF THE INVENTION

It is therefore an object of the present invention to provide an eye safe laser radar.

Another object of the present invention is to reduce the cost, size and complexity of laser radar.

A further object of the present invention is to improve the reliability of laser radars.

These and other objects are achieved by providing an eye safe micro pulse laser radar for profiling clouds and aerosol structure throughout the atmosphere. Eye safety is obtained by transmitting low power expanded pulses. In order to achieve good measurement sensitivity the laser transmitter is operated at high pulse rates and signals are acquired through high efficiency photon counting. Small receiver field of view and optical bandwidth serve to limit background induced noise for daytime measurements. The components on which my design is based are diode pumped Nd:YLF lasers, geiger mode avalanche photo diode photon counting detectors and single card multichannel scaler data acquisition. Signal simulations and initial measurement results show that it is possible to construct compact, all solid state lidars of my type which have the performance to monitor all cloud and significant aerosol scattering throughout the troposphere and into the stratosphere. Proposed uses are scientific studies and environmental monitoring applications which require full time, unattended measurements of the cloud and aerosol height structure.

DETAILED DESCRIPTION OF THE INVENTION

Figure 1:
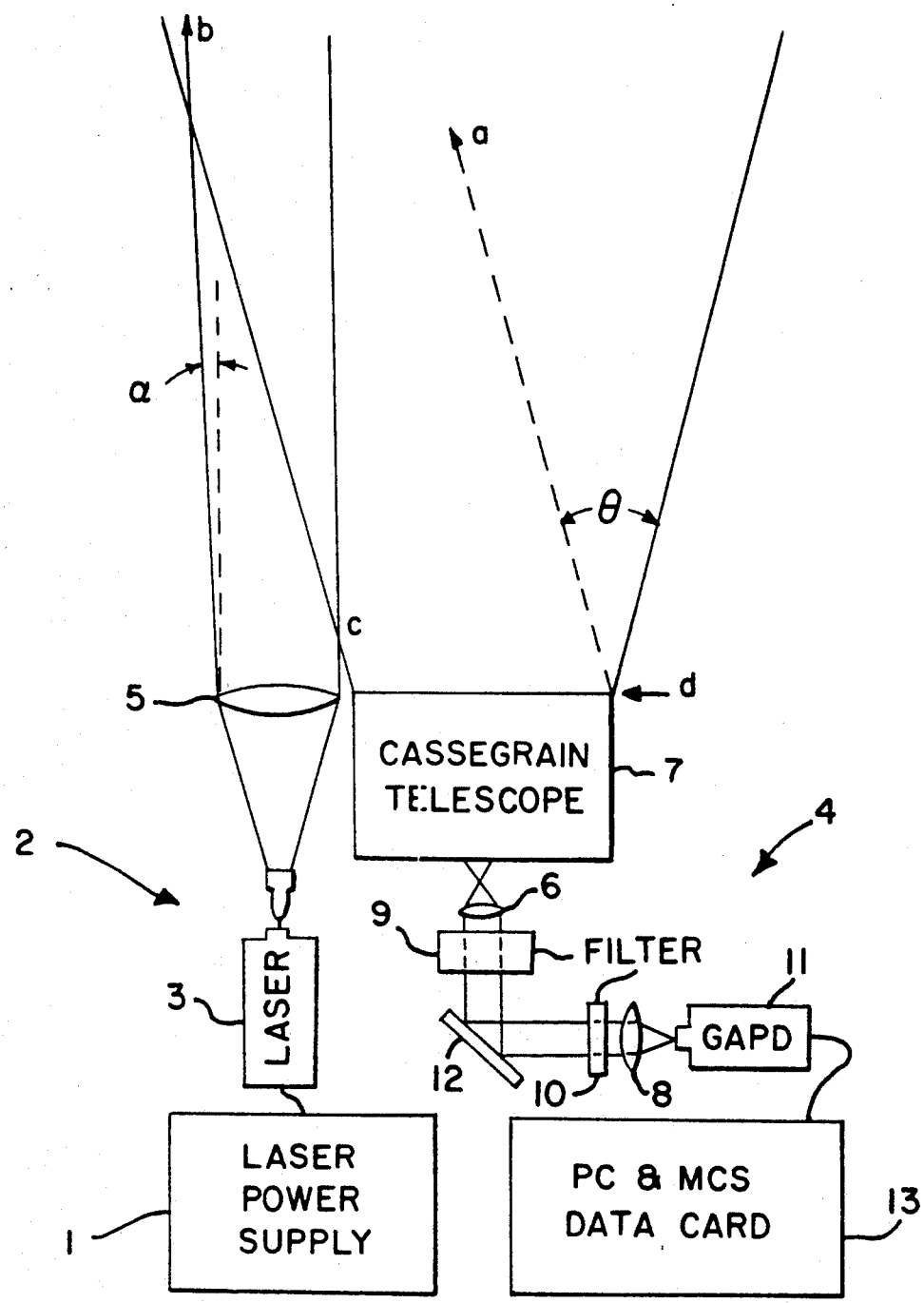
FIG. 1 is a block diagram of a micro pulse laser radar according to the present invention.

The two most basic parameters which determine the performance of a lidar system are the transmitter power and the receiver aperture. Twenty years ago a lidar system with an 0.2 m receiver and a ruby laser that could transmit a one Joule pulse three times a minute or 0.05 w transmitted power was employed. The system was more than adequate for aerosol scattering measurements in the cleanest air conditions throughout the troposphere and beyond. Diode pumped Nd:YAG and Nd:YLF lasers with pulse energies in the ten's of micro Joules and PRF beyond 10 kHz are now commercially available. Pulse repetition rates for lidar of up to 3 to 10 kHz are possible before interference between signals from consecutive pulses is a limit. For 10 $\mu$J pulses 0.05 w is transmitted at 5 kHz PRF. A micro pulse laser radar system with a 0.2 m aperture and an appropriate design should then be adequate for clear air observations. However for low pulse energies, detector efficiency and noise, and especially background signal noise, is a much more significant problem than for a high pulse energy system. As will be shown below the detector and background problems are manageable.

The present invention provides for an eye safe lidar by utilizing a transmitted beam that is safe at all ranges including at the exit aperture. For pulse energy in the micro Joule range eye safe power densities may be obtained by sufficiently expanding the transmitted beam. For the ANSI Z136.1-1986 laser exposure safety standard, the maximum permissible exposure (MPE) is $5 \times 10^{-7}$ J/cm$^2$ in the 520-530 nm wavelength range. In addition the MPE must be reduced by a factor of $N^{-0.25}$ for repetitive pulses where N is the number of pulses incident on the eye. For visible light it is assumed that the natural aversion response will limit exposure to 0.25 seconds, or 1250 pulses at 5 kHz PRF. The permissible energy density in that case is $8.4 \times 10^{-8}$ J/cm$^2$. For a laser beam expanded to 0.2 m diameter a 25 $\mu$J pulse energy is within the eye safety limit for direct viewing. Limits for other pulse energies are readily calculated, 40 $\mu$J for 25 cm and 4 $\mu$J for 8 cm. Other factors for the eye safety of a laser transmitter are eye aided viewing and scintillation. Eye aided viewing is not considered a factor for upward directed beams and scintillation effects are compensated by beam expansion. It may be noted that the FAA limits for transmitted radiation are much higher than the ANSI standard. The pulse energy needed for a micro pulse laser radar transmitter may thus be obtained with eye safety by reasonable expansion of the beam.

Signal Detection, Background and Dynamic Range: As will be give below, signals for a micro pulse laser radar system will be in range of a few photons per microsecond or less. At such signal levels quantum noise limited detection is required and in practice photon counting signal acquisition is needed. Photon counting signal detection has been previously used in lidar receivers, typically for high altitude measurements. The systems have employed photo-multiplier tube (PMT) detectors with discriminators and multichannel scalers for the signal acquisition. The systems are bulky, require high voltage and the quantum efficiency is typically only 5% to 20%. Solid state detectors were formerly too noise rich for quantum limited detection. A recent development are solid state, Geiger mode Avalanche Photo Diode (GAPD) detectors for photon counting signal detection. They are available packaged in a small self contained module with a pre-amp and discriminator. A very significant advantage is high quantum efficiency, over 40% in the 520 to 530 nm wavelength region. Although a micro pulse laser radar system could employ PMT detection, the GAPD detector provides a very major performance and design improvement.

At small signal levels, quantum noise from background sky radiance is the limiting factor for daytime lidar measurements. Two approaches are used to limit background signals in the lidar receiver relative to the backscatter return signal; reducing the receiver wavelength bandwidth and reducing the receiver field-of-view (FOV). For a micro pulse laser radar system, both approaches are required.

A limitation of photon counting lidar receivers has been the dynamic range of the signal acquisition. If $n_r$ is the maximum linear count rate, typically less than 10 counts/$\mu$sec, then to acquire a signal of Q reduced magnitude at the same signal to noise as an unsaturated $n_r$ signal requires summing over $Q^2$ times as many pulses. A dynamic range of two orders of magnitude will require averaging over 105 to 106 pulses; this is compatible with, and an advantage of, the present invention. However, the backscatter cross section for the full range of atmospheric scattering varies by over four orders of magnitude and range squared signal dependence can add another three to four order of magnitude to the dynamic range of a lidar signal. Dynamic range compensation in addition to pulse summation is required for a photon counting lidar system. A very significant dynamic range compression can be obtained through geometric signal compression. Geometric compression is obtained by optics design and is compatible with the small FOV requirement mentioned above. Depending on the, application additional active optical compression may be required.

Signal Equation: The equation for the lidar return signal in terms of photo electrons per time n is:

$$n(r) = cE(r)A_r T_o Q_e J(\beta_m(r) + \beta_p(r)) T^2(r) 2qr^2 \quad (1)$$

here r is range, E is the transmitter receiver geometric overlap factor, $A_r$ is the receiver area, $T_o$ is the system optical transmission, $Q_e$ is the detector quantum efficiency, J the transmitted pulse energy, $\beta_m$ and $\beta_p$ the molecular and particulate backscatter cross section, q the photon energy and T the atmospheric transmission.

In addition to the lidar signal, the detector signal will include any contribution from background photons $n_b$, given as:

$$n_b = I(\lambda) A_r T_o J06 \, \Delta\lambda Q_e/q \quad (2)$$

where $I(\lambda)$ is the background intensity, $\Omega$ the receiver FOV solid angle, and $\Delta\lambda$ the receiver optical bandwidth.

The lidar equation (1) includes the geometric overlap factor E(r) E(r) is equal to 1.0 at far ranges. At short ranges, E(r) is less than 1.0 and accounts for the fact that the telescope aperture of a lidar receiver is normally not the limiting aperture stop for the receiver optics for signals from short ranges. FIG. 1 indicates the outer profile of the receiver and transmitter FOV for a biaxial lidar design. The range where the lines labeled a and b intersect would be the range for the laser pulse to be fully in the receiver FOV for all elements of the receiver aperture. The overlap range is where E(r)=1 initially and is given by $r_v = 2d/(\Theta - \alpha)$ where $\Theta$ and $\alpha$ are the transmitter and receiver full FOV angles respectively and d is the maximum separation of the transmitter-receiver apertures. For results to follow $E(r<r_v)$ is calculated by numerical integration using equations such as given by J. Harms, "Lidar return signals for coaxial and noncoxial systems with central obstruction", Appl. Optics, vol. 18, 1559-1566, 1981. As mentioned previously, the E(r) factor can be designed for beneficial geometric compression of the dynamic range of the lidar return signal.

Atmospheric Model: For remote sensing simulations I have developed an analytic model of a vertical profile for atmospheric aerosol scattering. The model is based on extensive aerosol lidar measurements. The vertical distribution for the smooth background component of the aerosol scattering is given by $$\sigma(h) = \sigma_o(1+a)^2 \exp(h/b)[a+\exp(h/b)]^{-2} + f(1+a')^2 \exp(h/b')/[a+\exp(h/b')]^2 \quad (3)$$

where $\sigma(h)$ is the aerosol extinction coefficient at altitude h. The terms $\sigma_o$, a, a', b, b', f are constants. For the present invention, $\sigma_o = 0.025$, a=0.4, a'=2981, b=1.6, b'=2.5 and f=1.5e−7. The background particulate backscatter cross section is then $\beta = \sigma/S_p$ where $S_p$ is here chosen to be a constant value 30 sr as representative of tropospheric aerosols. In addition to the smooth aerosol model above, a discontinuous boundary layer aerosol scattering increase is added to the model. For the boundary layer $\sigma(h) = \sigma(h) + 0.05$ km$^{-1}$ for h from 0 to 1 km altitude.

Cirrus cloud profiling will be the most difficult cloud measurement for ground based lidar, and a cirrus layer is added to the model. For the cirrus layer $\sigma_c = 0.1$ is used and the layer extends from 8.0 to 10.0 km. The cirrus backscatter is $\beta_c = \sigma_c/S_c$ where $S_c = 10.0$ is applied as the effective extinction to backscatter ratio.

Figure 2:
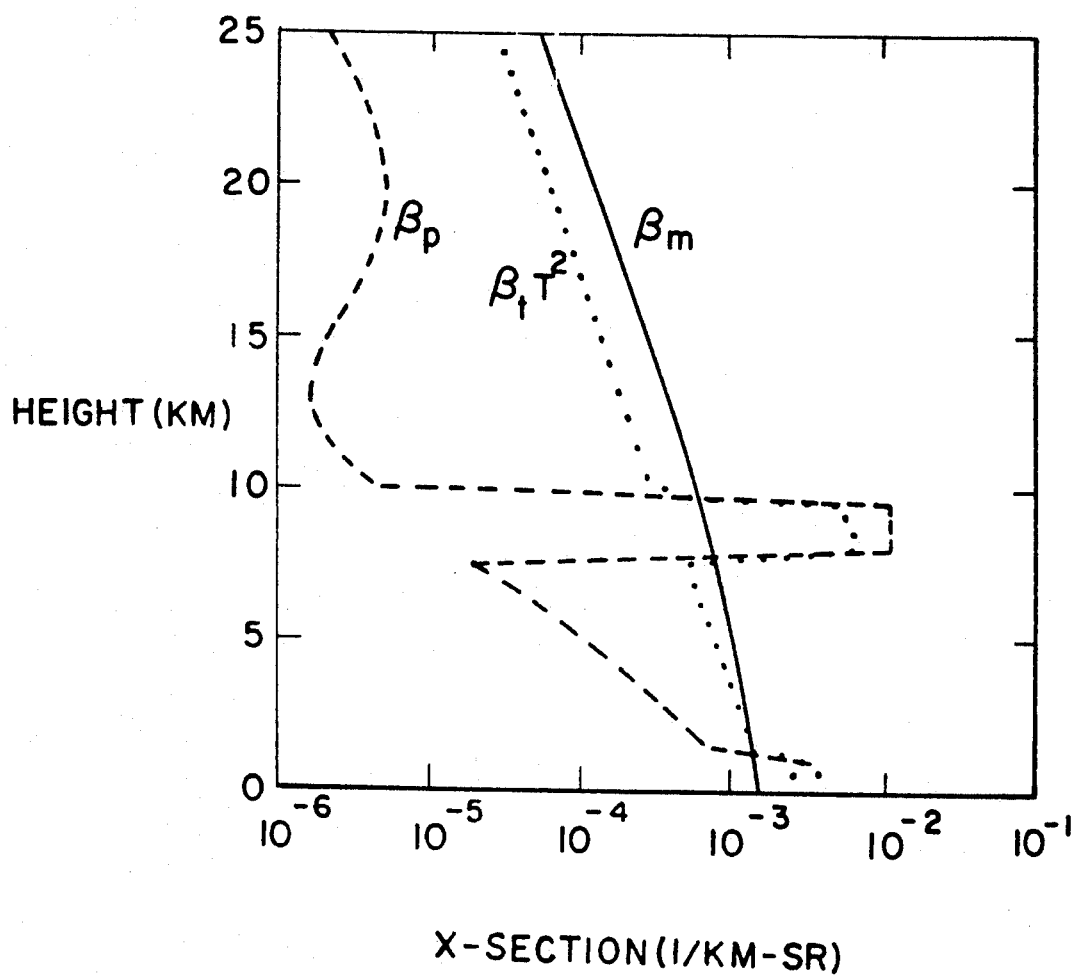
FIG. 2 depicts an atmospheric model employed to simulate the performance of lidar instruments. The particulate backscattering value $\beta_p$ is the sum of an analytic smooth background aerosol profile plus cirrus and boundary layer aerosol scattering layers. The molecular backscatter cross section $\beta_m$ is calculated for 523 nm wavelength. The term $\beta_rT^2$ includes the total backscatter cross section and atmospheric transmission and is the atmospheric term in the lidar signal equation.

The overall particulate backscatter cross section $\beta_p(h)$ for the atmospheric scattering model is shown in FIG. 2. The molecular backscatter cross section $\beta_m$ for the Nd:YLF II wavelength of 523 nm is also shown and is calculated for the US Standard Atmosphere mid latitude model. The lidar backscatter is a function of the atmospheric quantity $\beta_t T^2$ which is also shown in FIG. 2 where $\beta_t$ is the sum of all scattering and the transmission T is determined from the integral of the model's total extinction cross section. The aerosol scattering profile is based on older measurements but it may be noted that the model is consistent with measurements from the recent Global Backscatter Experiment. The value for $\beta_c$ of 0.01 (km-sr)[1] is consistent with a median value from extensive cirrus observations by an airborne cloud lidar system. The model includes an increase in scattering for a background statospheric aerosol layer with the peak at 20 km altitude and a particulate to molecular scattering ratio there of 5%.

Embodiments: System performance for three embodiments of a micro pulse laser radar according to the teachings of the present invention are described below. The instrument parameters are listed in Table 1. In the analysis, a Nd:YLF laser with a 523 nm wavelength was assumed for all three embodiments. In keeping with the goal of compact instruments, the largest receiver aperture was assumed as 0.2 m. The first embodiment (system 1) is considered as an instrument with minimal size, power and optical component quality. This is reflected by the 7.5 cm aperture, 2 µJ pulse energy and 0.08 optical transmission. The second embodiment (system 2) is representative of an instrument based on a laser with a 1 watt diode pump, a 0.2 m aperture and nominal optic transmission. The third embodiment (system 3) reflects optimal parameters for a 0.2 m receiver and transmitter to the stated 25 µJ eye safe pulse energy limit. The overlap range $r_v$ was approximately 4 km for all the systems.

TABLE 1

| System | 1 | 2 | 3 |
|---|---|---|---|
| Pulse Energy (µJ) | 2 | 10 | 25 |
| Receiver Diameter (m) | 0.075 | 0.2 | 0.2 |
| Optical Transmission | 0.08 | 0.1 | 0.2 |
| Detection Quantum Efficiency | 0.3 | 0.4 | 0.4 |
| Receiver Full FOV (µrad) | 100 | 100 | 100 |
| Transmitter Full FOV (µrad) | 80 | 50 | 50 |
| Filter Bandwidth (nm) | 0.2 | 0.2 | 0.2 |
| Day Background Signal | 0.06 | 1.0 | 2.1 |
| $I(\lambda) = 0.34 \, F_s/\pi \, (P_e/\mu S)$ | | | |

Figure 3:
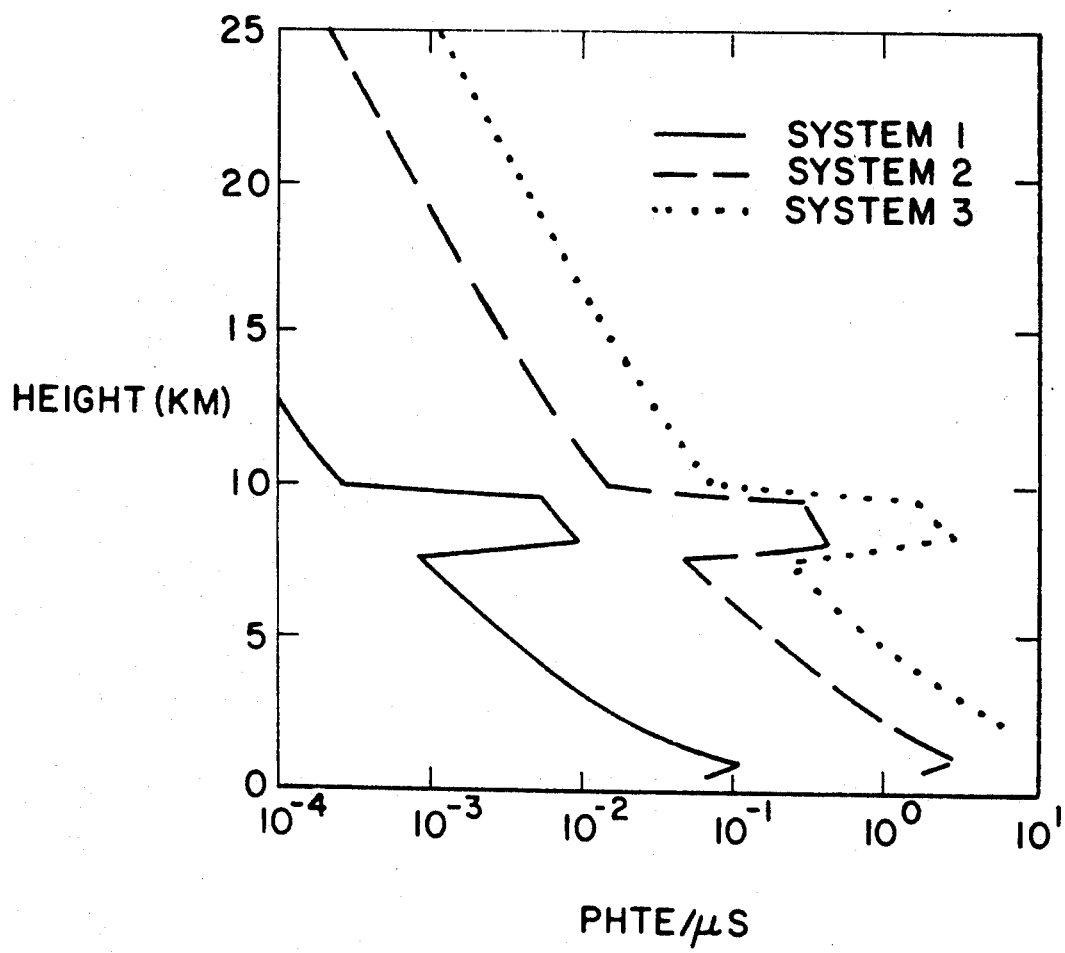
FIG. 3 depicts the calculated received signal in photoelectrons detected per $\mu$ second for three possible micro pulse laser radar systems as based on the model atmosphere and the system parameters given in Table 1.

Signal results: The calculated signal n(r) for the given system parameters and the applied atmospheric model is shown in FIG. 3. For the small system 1, signals are below 0.1 $P_e/\mu s$ for all ranges. The signals for system 2 exceed 1 $P_e/\mu s$ in the lowest few kilometers and would then be beyond the effective linear range of the current GAPD detectors. Signals for system 3 are beyond the 1 $P_e/\mu s$ range for the lowest five km and in the circus layer. Signals would still be in range for PMT photon Counting. A technique to compress the signal acquisition dynamic range further than the geometric compression as applied here would be to sequentially increase $T_o$ for the system between successive signals in order to acquire the out of range signal components.

In the daytime the background photon rate $n_b$ will be added to the laser signal. Values of $n_b$ are given in the last row of Table 1 for an assumed background of 0.2 w/m²-sr-nm, a value which would be near the upper level for a bright clear sky or thin cirrus background. It would correspond to one third the solar Lambertion diffuse intensity $F_s/\pi$.

Figure 4:
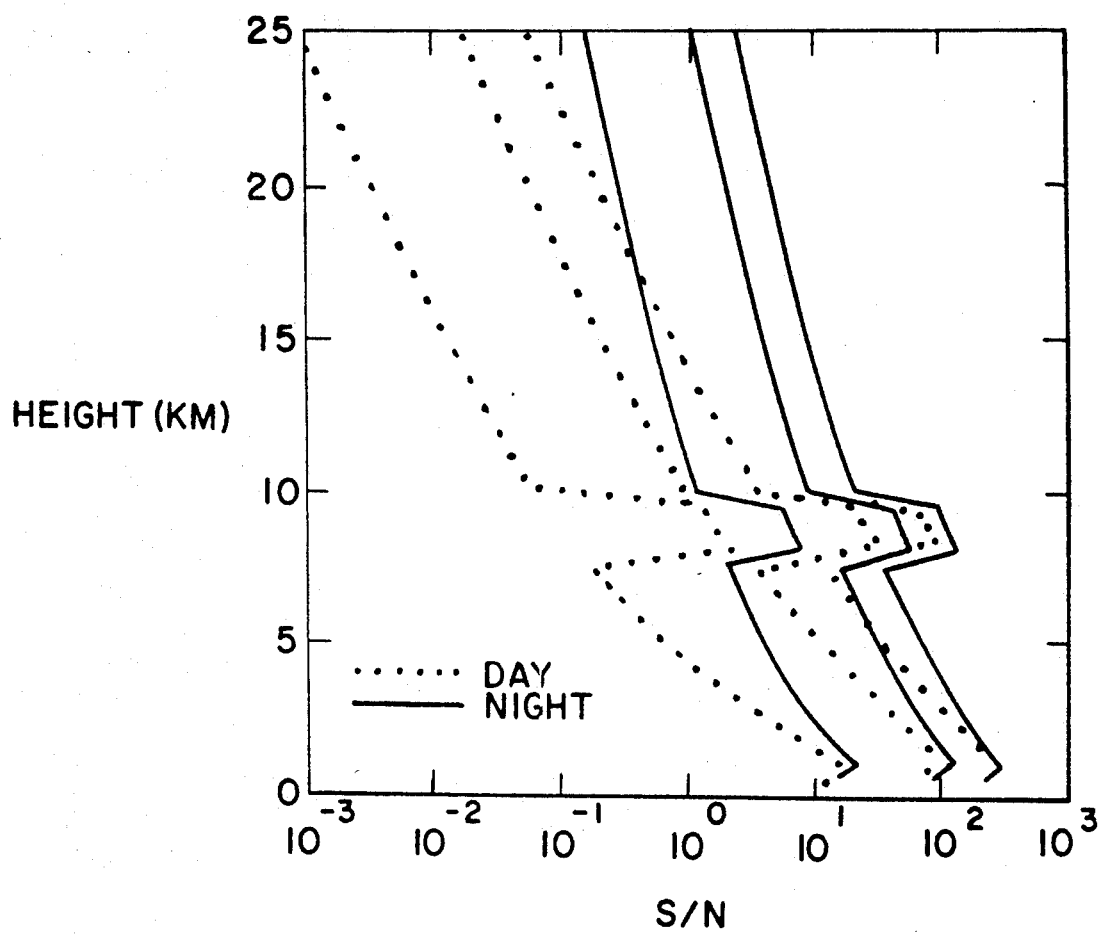
FIG. 4 depicts the calculated signal to noise ratio for the signal of the three sets of parameters given in Table 1 and for the model atmosphere. The calculation assumes a summation over $10^4$ pulses, or two seconds at a 5 kHz PRF, and 75 m vertical sampling. The curves for night assume no background signal noise. For the day case a background of one third the diffuse solar Lambertion intensity is applied which would be near the maximum value expected for zenith sky.

Calculation results of the signal to noise ratio S/N of the three systems are shown in FIG. 4. The signal to noise ratio is determined as:

$$S/N(r) = n(r)\Delta t/[(n(r)+n_b)\Delta t]^{\frac{1}{2}} \quad (4)$$

where $\Delta t$ is time bin for the signal acquisition. For the calculations of S/N given here $\Delta t = 0.5$ $\mu s$. The results in FIG. 4 are for a sum of $10^4$ pulses. For a micro pulse laser radar system, that would be equivalent to several seconds for each signal return. The S/N for a daytime and night case for each system is shown in FIG. 4. The day time case background photoelectron rate is that given in the last row of Table 1. The background induced quantum noise significantly decreases S/N. Also it may be seen that these maximum expected background count rates for the 0.2 m systems are beyond the level for linear operation for the current GAPD detectors. A corrective action would be to increase the system optical transmission $T_o$ for day time measurements although potential S/N would also then decrease.

From the signal analysis above it may be seen that all three systems could be applied for tropospheric aerosol and cirrus profiling. Although for the small system signal integration times longer than a few seconds would be required, and in the daytime a signal average over several minutes would be required to profile cirrus and boundary layer aerosols with better than 10% accuracy. That would be adequate for many applications. System 2 with a 0.2 m aperture and 10 $\mu J$ transmitter would adequately profile cirrus and boundary layer aerosol in several seconds day and night and even in day time produce a full scattering profile to the molecular level for the troposphere in several minutes.

The most difficult of the proposed applications mentioned previously would be profiling statospheric aerosols. Under background aerosol loading of the stratosphere, signal accuracy of 1 per cent or better would be required to resolve aerosol scattering from the molecular signal. For the number 3 system the measurement could be obtained at night with signals summed over several hours. At 300 m vertical resolution, which would be adequate, S/N would be twice that shown in FIG. 4. For a strong volcanic eruption cloud such as the current cloud from Pinatubo, a few minutes averaging would be sufficient. For monitoring the stratospheric layer a single profile per night would serve the basic requirement. Thus stratospheric aerosols measurements are a feasible application for a micro pulse laser radar system with a 0.2 m receiver. A 0.3 m and 40 $\mu J$ system would be four times more effective and should be possible.

A technology advancement that could significantly enhance the potential of micro pulse laser radar systems would be the development of solid state quantum noise limited detectors in the 1 $\mu m$ wavelength region. Eye safe power densities are an order of magnitude larger at 1 $\mu m$ than for 0.5 $\mu m$, and a near infrared laser beam would be invisible. Also the molecular scattering signal is reduced by a factor of 16 enhancing the discrimination of aerosol scattering. The development of these detectors has been suggested as feasible.

A micro pulse laser radar system according to the teachings of the present inventive concepts has been assembled and tested as a prototype optical assembly. The basic system configuration is as shown in FIG. 1. Transmitter 2 and receiver 4 are coaxial. Laser 3 is a Spectra-Physics model 7300 Nd:YLF system with the beam expanded and collimated by a simple microscope objective and condenser lens 5 combination to 8 cm diameter. Receiver telescope 7 is a custom designed F3, 0.2 m diameter Cassegrain system. Two lenses 6 & 8 collimate the receiver beam through narrow band filters 9 & 10 and also image the detector at the telescope focal plane. The detector is thus the field stop. For the RCA SPCM-IOO-PQ GAPD detector module 11, the highest detection efficiency is in a 50 micron center distance dropping in half at 75 microns. The FOV response was thus not sharply defined. The first interference filter 9 had a 0.25 nm bandpass and was temperature controlled for stability. A second 3 nm filter 10 was used in the prototype only for mechanical ease of sealing the detector from stray light. A mirror 12 with fine control optic mounts was used for detector alignment. A standard laser power supply 1 is used and PC 13 acquires the photon counting signal from GAPD 11.

A difficulty with a small FOV photon counting lidar is the alignment, or boresite, of the transmitter beam and receiver FO A precision corner cube retro-reflector was used for the initial alignment and the final boresite was accomplished by centering on far range cloud signals. For small FOV, scintillation, or thermal beam wandering, is a possible problem for the boresite stability Receiver-transmitter alignment instability due to scintillation however has not been observed to be a problem.

The micro pulse laser radar data system is simple and low cost. It consist of a 386 PC computer 13 with a Santa Fe Energy Research Nucleus Multichannel Scaler Card (MCS-11). The range bin of the current MCS is 2 $\mu s$ although 1 $\mu s$ is available. GAPD detector module 11 output may be fed directly to the MSC 13. The lidar return signals from multiple pulses are internally summed by MSC 13 and may be read out at any programmed interval. The current system features real time, height-time-intensity display of the signal data on the PC display screen.

The performance of the prototype system was expected to be similar to the previously mentioned system with a 0.075 m aperture. Although the prototype telescope aperture is 0.2 m, the overall optical transmission is less than 1.5% due to the second interference filter and uncoated optics. In addition the blur circle of the available Cassegrain telescope was 0.09 mrad and as a result the effective detector quantum efficiency for the returned laser signal is less than 30%.

Figure 5:
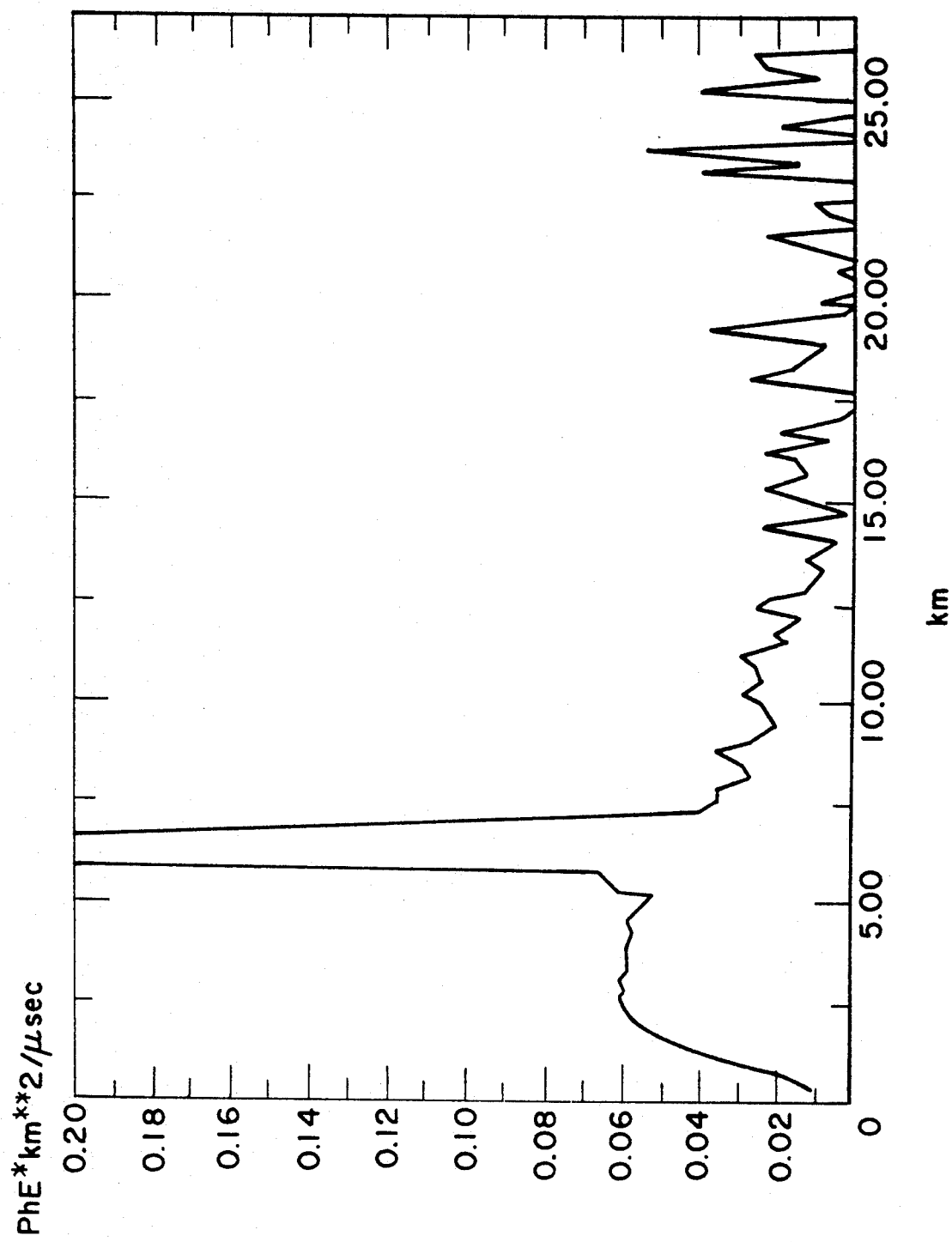
FIG. 5 depicts a received atmospheric signal from the micro pulse laser radar prototype system. The profile is a 30 minute average that was acquired at sunset on 6 Nov. 1991. The signal increases from zero to four kilometers as the pulse comes into the full receiver aperture field of view. At six kilometers altitude a thin cloud layer was present and produces a signal beyond the plotted range. Above the cloud layer the signal fluctuations would be due primarily to signal quantum noise.
Figure 6:
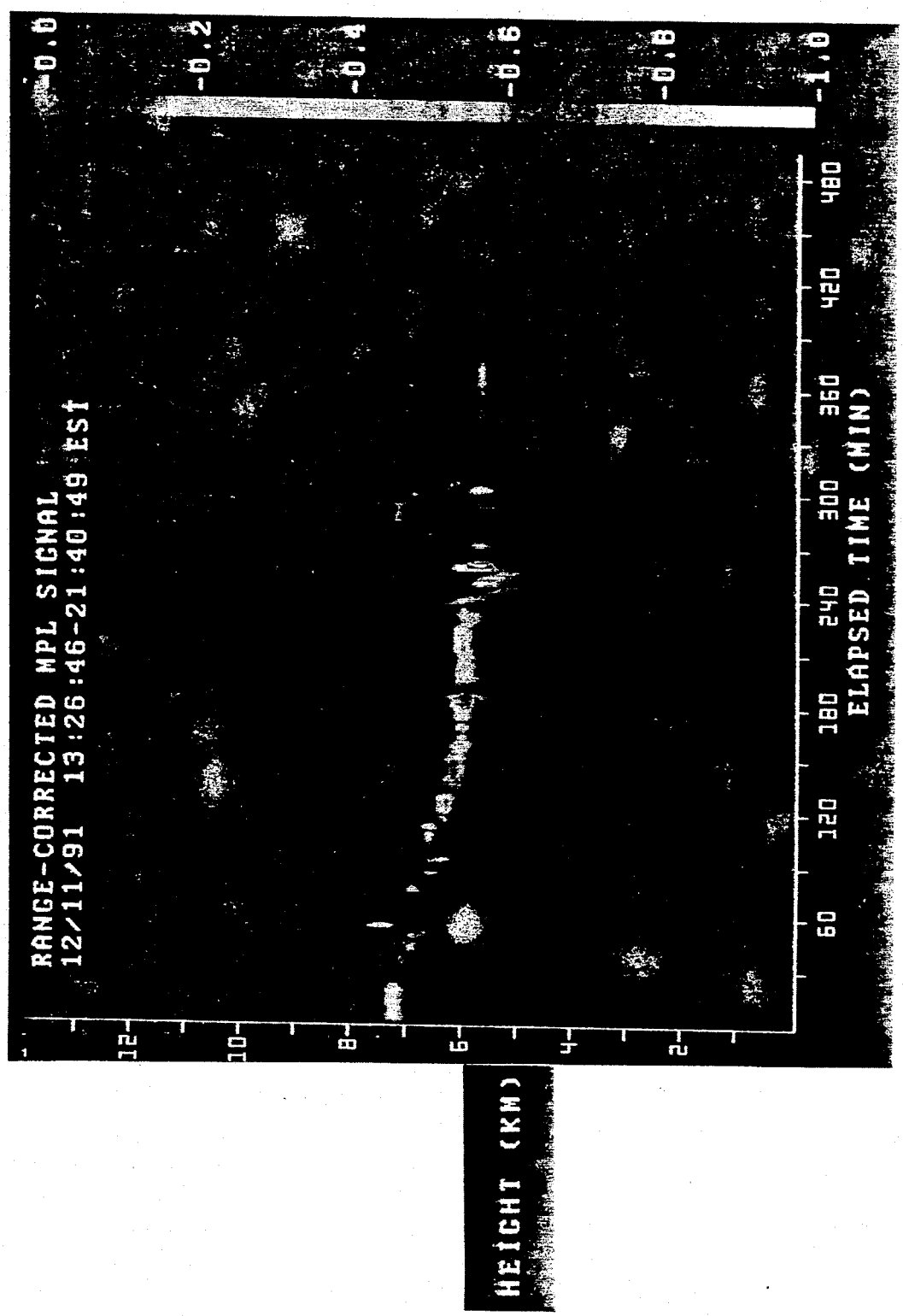
FIG. 6 depicts an eight hour observation of a thin cloud layer. The grey scale is proportional to the signal strength. The sun set at approximately two hours into the data record. The cloud layer was visually apparent but was sufficiently optically thin that sky and stars could be seen through the layer.

Examples of signals from the micro pulse laser radar prototype system are shown in FIG. 5 and 6. The profile in FIG. 5 is an average over approximately 30 minutes with the laser operating at 2.5 kHz PRF. The data were acquired on 6 Nov. 1991 at the time of sunset. For the measurement, a thin, broken cloud was at 6 km. The data is displayed multiplied by the range squared with the background count level subtracted. The cloud signal is beyond the plot range but however was not saturated. The overlap range of the prototype system was approximately 4 km. No correction below that distance is shown in FIG. 5 for the fall off of the signal due to the near range optical factor. The signal above the cloud was obtained both between and through cloud cells. Above 10 km the signal fluctuations would be due primarily to signal quantum noise. The increased signal at 22 to 27 km is consistent with the altitude of the strong stratospheric volcanic aerosol layer that was present at the time the data were acquired.

A time height display of data for another case is shown in FIG. 6. A thin cloud layer was observed over a eight hour time period. The sun set at two hours into the data sequence. The cloud layer could be seen visually but was also sufficiently thin that background stars and sky could be seen through the layer. The thin cloud layer is seen to be clearly defined by the micro pulse laser radar data. My current experience with the micro pulse laser radar prototype system is that all visually apparent clouds including cirrus can be profiled with signal averages of a few minutes. For the given low optical transmission and poor detector coupling of the prototype design, the micro pulse laser radar signal magnitudes are in the range that would be expected.

Applications: Potential applications for micro pulse laser radar systems are both for scientific use and applied environmental monitoring. Observation of cloud base height and profiling cirrus is important for surface radiation budget and climate modelling in general. Current ceilometer instruments are not adequate for the cloud radiation applications. Routine lidar measurements to study the interaction of clouds and aerosols with the atmosphere have been attempted or are ongoing. A number of organized scientific projects in the area of clouds and atmospheric radiation have required, or emphasized, high quality lidar cloud profiling. These include ECLIPS (Experimental Cloud Lidar Pilot Study), ISCCP (International Satellite Cloud Climatology) regional experiments and the ARM (Atmospheric Radiation Measurement) Program. Some programs have involved intensive use of research quality atmospheric lidars. The future points toward a requirement for long term measurements at an increasing number of sites.

Lidar is possibly the best tool for ground based measurements of the atmospheric aerosol loading and structure. Monitoring of the stratospheric aerosol layer by lidar has been a long term endeavor at a number of sites around the world. Tropospheric aerosol structure and in particular planetary boundary layer, or inversion, height measurements by lidar have been employed increasingly in atmospheric field experiments for atmospheric dynamics, pollution and other studies. These measurements could be potentially obtained more simply and routinely by a micro pulse laser radar.

Applied environmental observations that could be potentially improved by micro pulse laser radar instruments would be improved cloud ceilometry and visibility monitoring. An application that would possibly be enabled would be monitoring of particulate density and inversion heights for pollution level modeling and prediction.

To those skilled in the art, many modifications and variations of the present invention are possible in light of the above teachings. It is therefore to be understood that the present invention can be practiced otherwise than as specifically described herein and still will be within the spirit and scope of the appended claims.

I claim:

1. A eye safe laser radar system operating in the visual spectrum for profiling clouds and aerosols comprising:
   a laser transmitter for transmitting an outgoing laser beam at a wavelength in the range of 0.4 to 0.8 $\mu$m, operating at a pulse energy of less than 40 $\mu$Joules and a pulse repetition rate of greater than 1000 hertz;
   means for expanding and collimating said outgoing laser beam;
   receiver means for receiving an incoming laser beam, said incoming laser beam being a backscatter of said outgoing laser beam from atmospheric targets, said incoming laser beam being directed to a photon counting signal detector means;
   means for collimating and filtering said incoming laser beam prior to said photon counting signal detector means;
   means for acquiring and processing a signal from said detector means to profile atmospheric clouds and aerosols.

2. The device of claim 1 wherein said laser transmitter is a diode pumped Nd:YAG laser.

3. The device of claim 1 wherein said laser transmitter is a diode pumped Nd:YLF laser.

4. The device of claim 1 wherein said photon counting signal detector means is a Geiger mode Avalanche Photo Diode detector.

5. The device of claim 1 wherein said receiver means comprises a Cassegrain telescope.

6. The device of claim 4 wherein said means for acquiring and processing a signal from said detector means comprises a computer with a multichannel scaler card.

* * * * *